(12) United States Patent
Kwak (10) Patent No.: US 10,740,155 B1
(45) Date of Patent: Aug. 11, 2020

(54) METHODS AND SYSTEMS FOR LOAD BALANCING IN NETWORK DEVICES

(71) Applicant: Cavium, LLC, Santa Clara, CA (US)

(72) Inventor: David Kwak, Newport Coast, CA (US)

(73) Assignee: Cavium, LLC, Santa Clara, CA (US)

( * ) Notice: Subject to any disclaimer, the term of this patent is extended or adjusted under 35 U.S.C. 154(b) by 111 days.

(21) Appl. No.: 16/146,539

(22) Filed: Sep. 28, 2018

(51) Int. Cl.
*G06F 9/50* (2006.01)
*H04B 10/25* (2013.01)

(52) U.S. Cl.
CPC ............. *G06F 9/505* (2013.01); *H04B 10/25* (2013.01)

(58) Field of Classification Search
CPC .......................... G06F 9/50–505; H04B 10/25
USPC ..................................................... 718/1–108
See application file for complete search history.

(56) References Cited

U.S. PATENT DOCUMENTS

| | | | | | |
|---|---|---|---|---|---|
| 4,621,359 | A | * | 11/1986 | McMillen | H04L 47/11 370/235 |
| 5,224,100 | A | * | 6/1993 | Lee | G06F 15/17368 370/408 |
| 5,274,782 | A | * | 12/1993 | Chalasani | G06F 15/17393 710/317 |
| 6,078,944 | A | * | 6/2000 | Enko | G06F 9/5088 718/105 |
| 2005/0149638 | A1 | * | 7/2005 | Maeda | G06F 3/0613 710/6 |

OTHER PUBLICATIONS

LeBeane, Michael, et al. "Data partitioning strategies for graph workloads on heterogeneous clusters." Proceedings of the International Conference for High Performance Computing, Networking, Storage and Analysis. IEEE, 2015.pp. 1-12 (Year: 2015).*

Yung, N. H. C., and K. C. Chu. "Fast and parallel video encoding by workload balancing." SMC'98 Conference Proceedings. 1998 IEEE International Conference on Systems, Man, and Cybernetics (Cat. No. 98CH36218). vol. 5. IEEE, 1998.pp. 4642-4647 (Year: 1998).*

Fischer, Lorenz, and Abraham Bernstein. "Workload scheduling in distributed stream processors using graph partitioning." 2015 IEEE International Conference on Big Data (Big Data). IEEE, 2015.pp. 124-133 (Year: 2015).*

(Continued)

*Primary Examiner* — Satish Rampuria
(74) *Attorney, Agent, or Firm* — Klein, O'Neill & Singh, LLP (57) ABSTRACT

Methods and systems for network devices are provided. One method includes receiving a frame by a network device communicating with a computing device via a peripheral link, the network device receiving the frame via a network connection; using one or more frame header fields to generate a frame context by the network device; determining if a processor of the network device is processing another frame with the same frame context; assigning the frame context to a first processor of the network device, when the first processor is processing the other frame with the same frame context; and when neither processor is processing the same frame context, selecting between the first processor and a second processor of the network device, based on a workload of the first processor and the second processor, the workload determined by a number of contexts that are pending for the first processor and the second processor.

20 Claims, 5 Drawing Sheets

(56) References Cited

OTHER PUBLICATIONS

Al Nuaimi, Klaithem, et al. "A survey of load balancing in cloud computing: Challenges and algorithms." 2012 second symposium on network cloud computing and applications. IEEE, 2012.pp. 137-142 (Year: 2012).*

Kaur, Rajwinder, and Pawan Luthra. "Load balancing in cloud computing." Proceedings of international conference on recent trends in information, telecommunication and computing, ITC. 2012.pp. 374-381 (Year: 2012).*

Mondal, Brototi, Kousik Dasgupta, and Paramartha Dutta. "Load balancing in cloud computing using stochastic hill climbing—a soft computing approach." Procedia Technology 4 (2012): pp. 783-789. (Year: 2012).*

* cited by examiner

METHODS AND SYSTEMS FOR LOAD BALANCING IN NETWORK DEVICES

TECHNICAL FIELD

The present invention relates to network devices and more particularly, for load balancing in network devices.

BACKGROUND

Computing systems typically use adapters and network devices for sending data to, and receiving data from other networked devices. Network adapters today are being developed to operate at very high speeds, for example, 128 gigabits per second (G). Continuous efforts are being made to efficiently process network frames to accommodate high network and adapter operating speeds.

BRIEF DESCRIPTION OF THE DRAWINGS

The various aspects relating to securing data will now be discussed in detail with an emphasis on highlighting the advantageous features. These novel and non-obvious aspects are shown in the accompanying drawings, which are for illustrative purposes only. These drawings include the following figures, in which like numerals indicate like parts.

DETAILED DESCRIPTION

The following detailed description describes the various present aspects with reference to the drawings. In the drawings, reference numbers label elements of the present aspects. These reference numbers are reproduced below in connection with the discussion of the corresponding drawing features.

As a preliminary note, any of the aspects described with reference to the figures may be implemented using software, firmware, hardware (e.g., fixed logic circuitry), or a combination of these implementations. The terms "logic", "module", "component", "system", and "functionality", as used herein, generally represent software, firmware, hardware, or a combination of these elements. For instance, in the case of a software implementation, the terms "logic", "module", "component", "system", and "functionality" represent program code that performs specified tasks when executed on a hardware processing device or devices (e.g., CPU or CPUs). The program code can be stored in one or more non-transitory computer readable memory devices and maybe based on the various process flows described below in detail.

More generally, the illustrated separation of logic, modules, components, systems, and functionality into distinct units may reflect an actual physical grouping and allocation of software, firmware, and/or hardware, or can correspond to a conceptual allocation of different tasks performed by a single software program, firmware program, and/or hardware unit. The illustrated logic, modules, components, systems, and functionality may be located at a single site (e.g., as implemented by a processing device), or may be distributed over a plurality of locations.

The term "machine-readable media" and the like refers to any kind of nontransitory storage medium for retaining information in any form, including various kinds of storage devices (magnetic, optical, static, etc.).

The various aspects disclosed herein, may be implemented as a computer process (method), a computing system, or as an article of manufacture, such as a computer program product or computer-readable media. The computer program product may be non-transitory computer storage media, readable by a computer device, and encoding a computer program of instructions for executing a computer process.

Figure 1A:
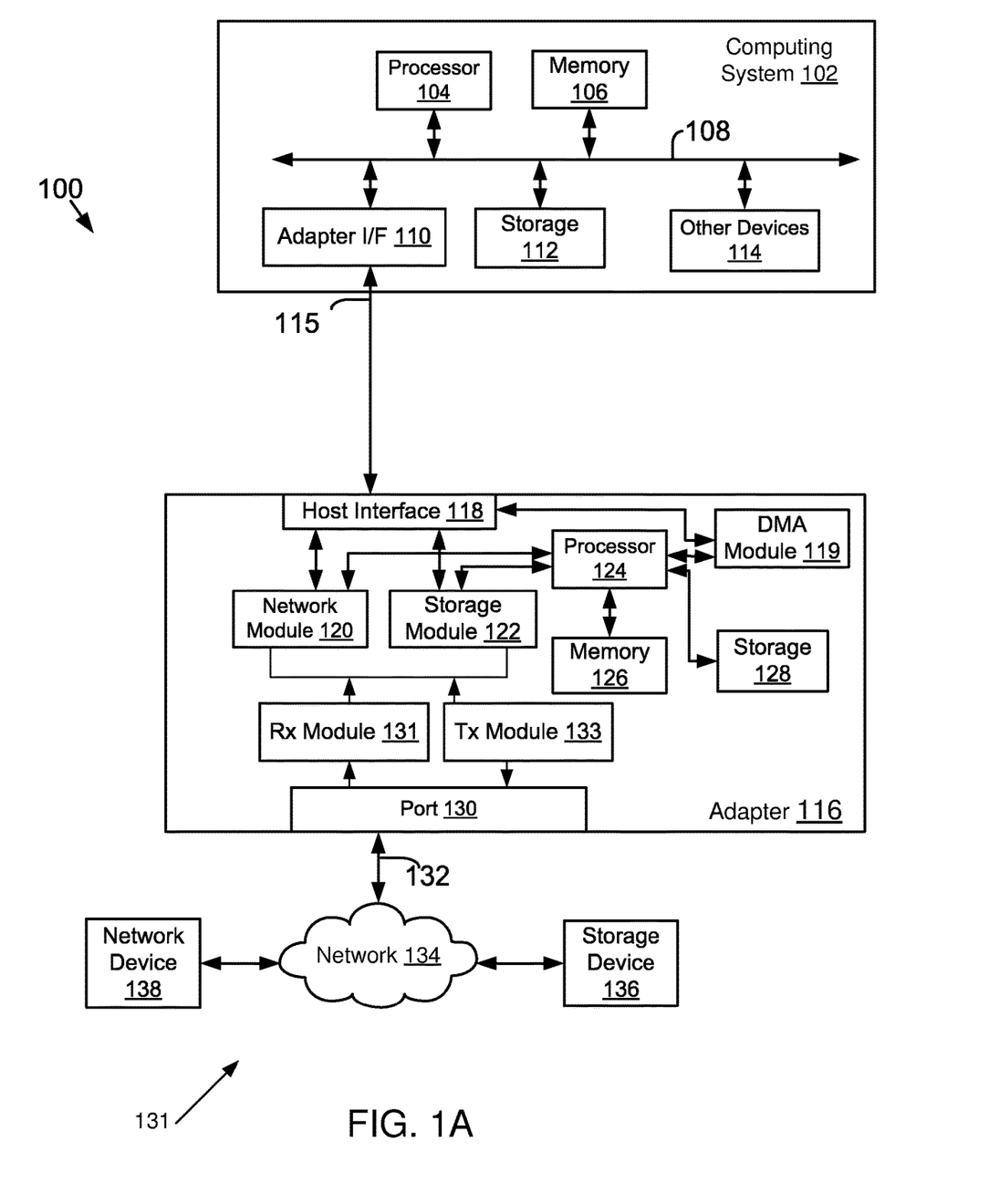
FIG. 1A is a functional block diagram of a system used according to one aspect of the present disclosure.

System 100:

FIG. 1A shows an example of a system 100 configured for use with the various aspects of the present disclosure. System 100 may include one or more computing systems 102 (may also be referred to as "host system 102") coupled to an adapter (or network device) 116 via a link 115. Link 115 may be an interconnect system, for example, a PCI-Express (PCIe) link or any other interconnect type. The adapter 116 interfaces with a network 134 via one or more network links 132. The network 134 may include, for example, additional computing systems, servers, storage systems, etc.

The computing system 102 may include one or more processors (or processing logic) 104, also known as a central processing unit (CPU). Processor 104 may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The processor 104 executes computer-executable process steps out of memory 106 via an interconnect (or computer bus) 108. The computer bus 108 may be, for example, a system bus, a Peripheral Component Interconnect (PCI) bus (or a PCIe bus), a HyperTransport or industry standard architecture (ISA) bus, a SCSI bus, a universal serial bus (USB), an Institute of Electrical and Electronics Engineers (IEEE) standard 1394 bus (sometimes referred to as "Firewire"), or any other interconnect type.

The computing system 102 may also include other devices and interface 114, which may include a display device interface, a keyboard interface, a pointing device interface, etc. Details regarding the other devices 114 are not germane to the aspects disclosed herein.

The computing system 102 may further include a local storage device 112, which may be for example a hard disk, a CD-ROM, a non-volatile memory device (flash or memory stick) or any other mass storage device. Storage 112 may store operating system programs and data structures, application program data, and other data. Some of these files are stored on storage 112 using an installation program. For example, the processor 104 may execute computer-executable process steps of an installation program so that the processor 104 can properly execute the application program.

Memory 106 (maybe referred to as host memory 106) also interfaces with the computer bus 108 to provide the processor 104 with access to memory storage. Memory 106 may include random access main memory (RAM) or any other memory type. When executing stored computer-executable process steps from storage 112, processor 104 may store and execute the process steps out of RAM. Read only memory (ROM, not shown) may also be used to store invariant instruction sequences, such as start-up instruction sequences or basic input/output system (BIOS) sequences for operation of a keyboard (not shown).

In one aspect, adapter 116 may be configured to handle network, storage and both network and storage traffic. Some common protocols/technologies used for handling network/storage traffic are described below.

One common network protocol is Ethernet. The original Ethernet bus or star topology was developed for local area networks (LAN) to transfer data at 10 Mbps (megabits per second). Newer Ethernet standards (for example, Fast Ethernet (100 Base-T) and Gigabit Ethernet) support higher data transfer rates for example, above 100 Mbps. The descriptions of the various aspects described herein are based on using Ethernet (which includes 100 Base-T and/or Gigabit Ethernet) as the network protocol. However, the adaptive aspects disclosed herein are not limited to any particular protocol, as long as the functional goals are met by an existing or new network protocol.

One common storage technology used to access storage systems is Fibre Channel (FC). Fibre Channel is a set of American National Standards Institute (ANSI) standards that provide a serial transmission protocol for storage and network protocols such as HIPPI, SCSI, IP, ATM and others. Fibre Channel supports three different topologies: point-to-point, arbitrated loop and fabric. The point-to-point topology attaches two devices directly. The arbitrated loop topology attaches devices in a loop. The fabric topology attaches computing systems directly (via HBAs) to a fabric, which are then connected to multiple devices. The Fibre Channel fabric topology allows several media types to be interconnected. Fibre Channel fabric devices include a node port or "N_Port" that manages Fabric connections. The N_port establishes a connection to a Fabric element (e.g., a switch) having a fabric port or F_port.

Fibre Channel over Ethernet (FCOE) has been developed to handle both Ethernet and Fibre Channel traffic in a storage area network (SAN). This functionality enables FC to leverage high-speed Ethernet networks while preserving the FC protocol. The adapter 116 shown in FIG. 1A may be configured to operate as a FC adapter or a FCOE adapter. The illustrated adapter 116, however, does not limit the scope of the present aspects. The present aspects may be practiced with adapters having different configurations supporting other protocols, for example, InfiniB and, Remote Direct Memory Access (RDMA) and others.

Referring back to FIG. 1A, adapter 116 communicates with host system 102 via a host interface (may be referred to as "interface") 118 and link 115. In one aspect, interface 118 may be a PCI-Express interface having logic/circuitry for sending and receiving PCI-Express packets. The adapter 116 may also include a processor 124 that executes firmware instructions out of a memory 126 to control overall adapter operations. The adapter 116 may also include local storage 128, which may be for example non-volatile memory, such as flash memory, or any other device. The local storage 128 may store executable instructions and operating parameters that can be used for controlling adapter operations.

The adapter 116 includes a network module 120 for handling network traffic via a link 132. In one aspect, the network module 120 includes logic and circuitry for handling network packets, for example, Ethernet or any other type of network packets. The network module 120 may include memory buffers to temporarily store information received from other network devices 138 and transmitted to other network devices 138.

The adapter 116 may also include a storage module 122 for handling storage traffic to and from storage devices 136. The storage module 112 may further include memory buffers to temporarily store information received from the storage devices 136 and transmitted by the adapter 116 to the storage devices 136. In one aspect, the storage module 122 is configured to process storage traffic according to the FC protocol, or any other protocol. It is noteworthy that adapter 116 may only have a network module 120 or a storage module 122. The various aspects described herein are not limited to any particular adapter type.

The adapter 116 also includes a port (may also be referred to as network interface) 130 that interfaces with link 132 via one or more ports (not shown). The network interface 130 includes logic and circuitry to receive information via the network link 132 and transfer the information to either the network module 120 or the storage module 122, depending on the packet type.

Adapter 116 also includes a direct memory access (DMA) module 119 that is used to manage access to link 115. The DMA module 119 uses a plurality of DMA channels (not shown) for managing access to link 115. The DMA channels are typically used to move control structures such as input/output control blocks (IOCBs), input/output status blocks (IOSBs) and data between host system memory 106 and the adapter memory 126. It is noteworthy that the DMA module 119 may have a transmit side (Tx) DMA segment to bring data from host memory 106 to the adapter and a receive side (rx) DMA segment to send data to the host memory 106.

Adapter 116 may include a Rx (receive) module 131 for processing incoming frames and Tx (transmit) module 133 for processing frames that are transmitted by the adapter 116. It is noteworthy that Rx module 131 and Tx module 133 may be integrated with the storage module 122 and network module 120. For sake of clarity, these modules are shown separately.

In one aspect, network interface 130 receives serial data from network link 132. The serial data is received by a SERDES (not shown) having a serializer and a de-serializer. The de-serializer de-serializes serial data into parallel data for processing by upper layer logic, for example, Rx module 131. Details of Rx module processing are provided below.

Figure 1B:
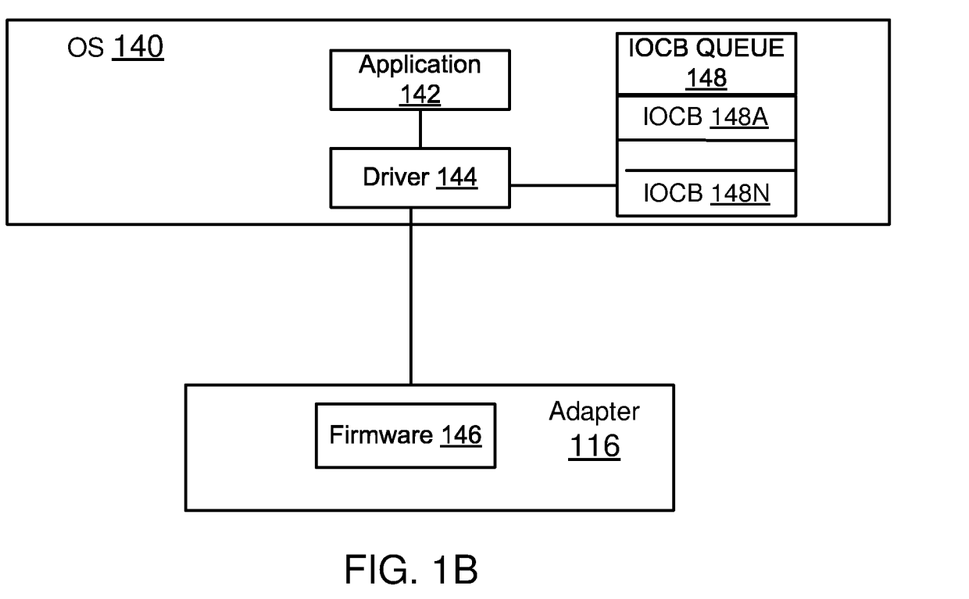
FIG. 1B shows a block diagram of a generic software architecture used by the system of FIG. 1A.

Software Architecture:

FIG. 1B shows an example of a generic software architecture used by the various components of system 100. Processor 104 of the host system 102 executes an operating system 140 for controlling the overall operations of host computing system 102. The operating system may be Windows based, Linux operating system, Solaris, or any other operating system type (without derogation of any third party trademark rights). The aspects disclosed herein are not limited to any particular operating system type.

An application 142 may be executed by processor 104 for performing certain functions. For example, application 142 may be an email program, a database application or any other application type. Application 142 may send a command to a host driver 144 for performing an operation, for example, reading and/or writing data (input/output (I/O) at another storage device. The driver 144 processes the request and communicates with firmware 146 executed by processor 124 of adapter 116. One or more components of adapter 116 then process the request.

Typically for managing data transfers across link 115 an IOCB (Input Output Control Block) is first generated by the driver 144 and saved at an IOCB queue 148, shown as 148A-148N. The IOCB queue 148 may be at host memory 106 or any other location. The IOCB is obtained by adapter 116 which may be to provide data to host processor 104 or to send data provided by host processor 104. Both IOCB fetch and data transfer operations are performed using DMA operations via DMA channels (not shown). Based on the IOCB, adapter 116 executes the operations that may be needed. Adapter 116 then uses DMA operations to send a status block (IOSB) to processor 104 indicating the completion of IOCB execution and associated data transfer.

Figure 1C:
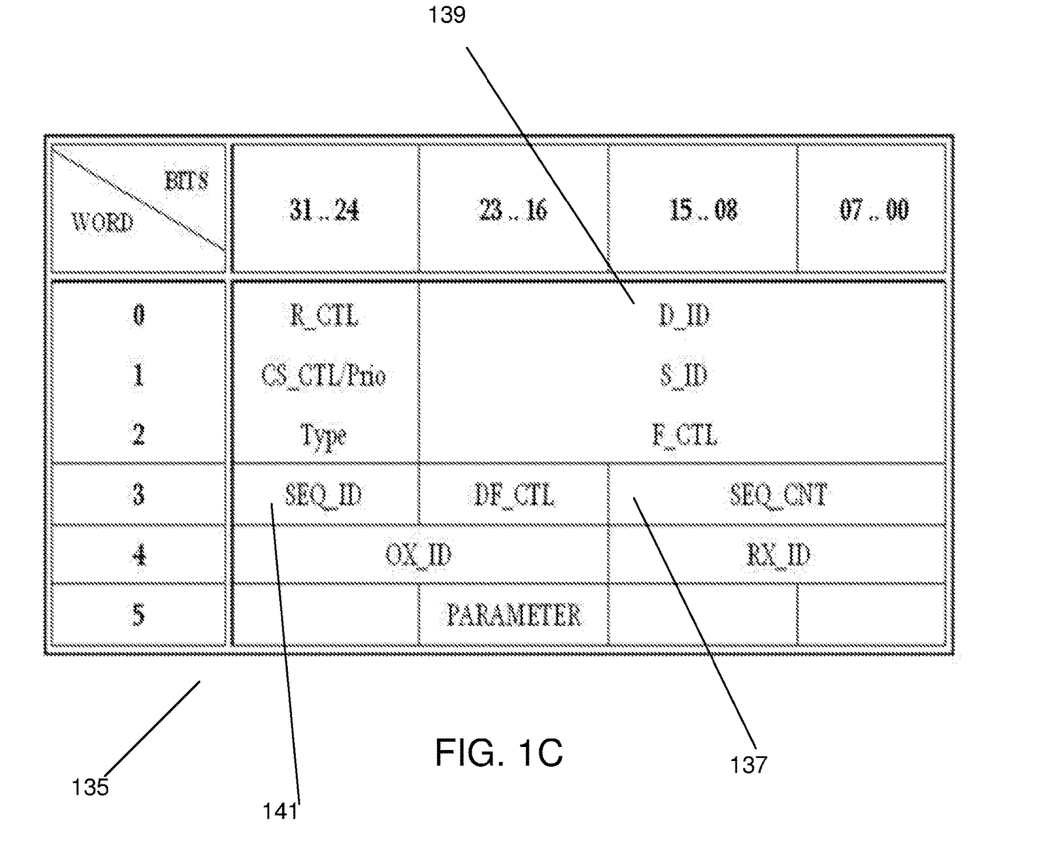
FIG. 1C shows an example of a Fibre Channel frame for generating a context, according to one aspect of the present disclosure.

FIG. 1C shows an example of a Fibre Channel frame header 135 for implementing the methods and systems, described herein. The frame header 135 may be 24 bytes with various fields, for example, R_CTL: a routing control field; CS-CTL field that assigns a frame's priority; a Type field indicating the frame type; D_ID: a field that identifies a destination; S_ID: a source identifier; and F_CTL: a flag for frame control (e.g. abort and others). The SEQ_ID 141 is an unsigned binary number identifying the sequence of which the frame is a part. The SEQ_ID 141 is assigned by a sequence initiator and is unique for a specific D_ID and S_ID pair, while the sequence is open. The SEQ_CNT 137 is an unsigned binary number identifying the order of frame transmission within a single sequence or multiple consecutive sequences for the same exchange. OX_ID is the originator exchange ID field that identifies an exchange ID assigned by the originator of an exchange. This field is also used by an originator exchange status block to track the progress of a series of sequences that comprise an exchange. RX_ID is the responder exchange ID field assigned by a responder to provide a unique identifier for an exchange established by an originator and identified by an OX_ID. The "Parameter" field is a relative offset for data or link control information. The DF-CTL field provides control flags and maybe used to indicate if a frame is encrypted or not.

In one aspect, the S-ID, OX_ID, RX_ID, sequence number and the Sequence_Cnt may be used by the adapter 116 to generate a context for a frame received via the network 134, as described below in detail.

Figure 2:
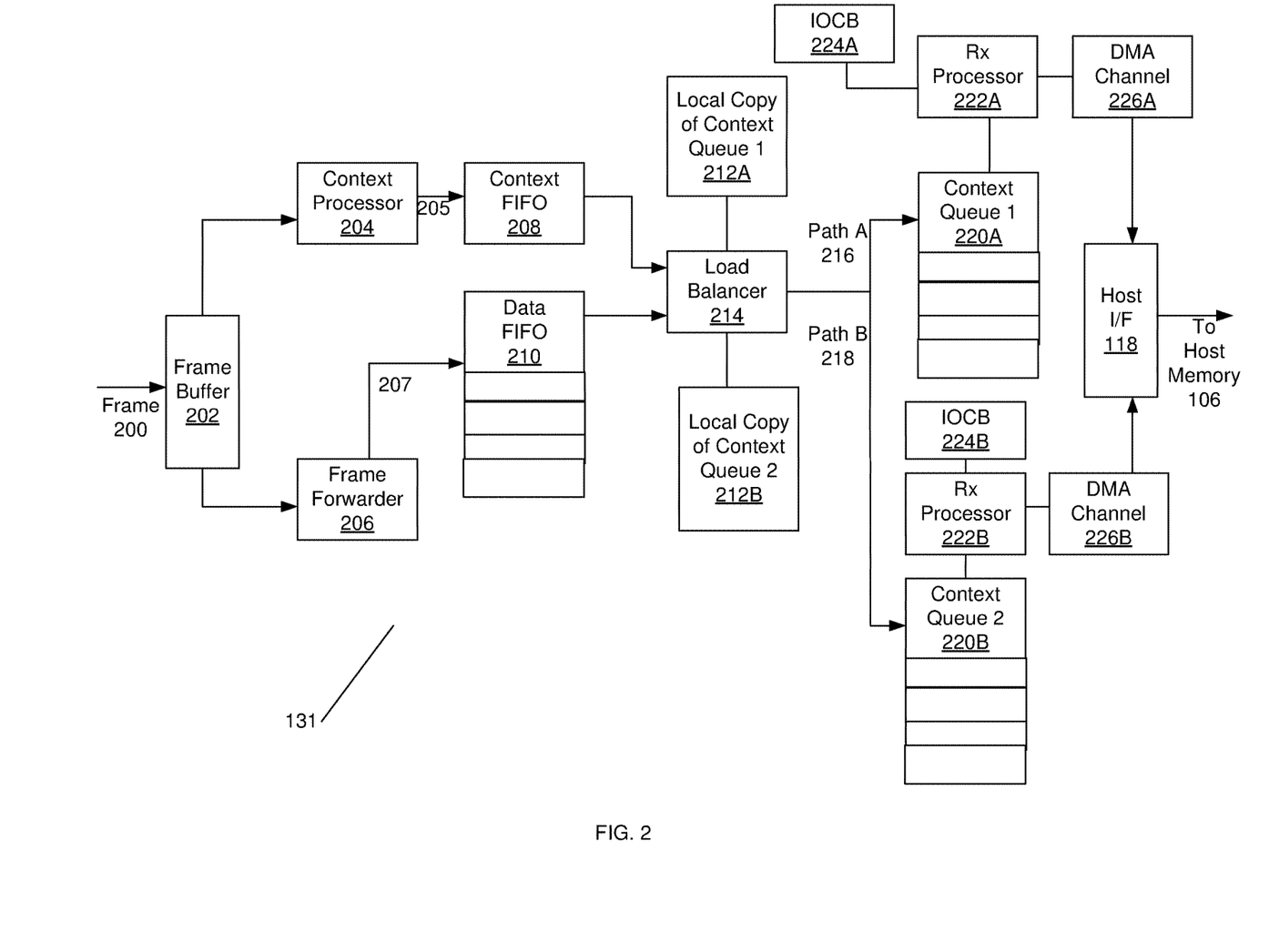
FIG. 2 shows an example of a load balancing system of an adapter (or network device), according to one aspect of the present disclosure.

Rx Module 131:

FIG. 2 shows a block diagram of the Rx module 131, according to one aspect of the present disclosure. The Rx module 131 receives incoming frames 200 at port 130. The frames are temporarily stored at a frame buffer 202. A context processor 204 evaluates a frame header and generates a context 205 for the received frames. As described above, the context 205 is generated based on a plurality of frame header fields. The context 205 is forwarded and stored at a context FIFO (First-In-First-Out memory storage location) 208. The payload 207 in the frame is forwarded by a frame forwarder 206 to a storage location, shown as data FIFO 210.

A load balancer 214 evaluates the context of the frames and selects either path 216 or 218 (shown as Path A, 216 and Path B, 218) to process the frame. Paths 216 and 218 each include a Rx processor 222A and 222B, respectively. Each Rx processor 222A/222B maintains a context queue 220A and 220B, respectively, to store context information for contexts that are being processed at any given time. Each Rx processor also has access to an associated IOCB shown as 224A and 224B at the adapter memory. The IOCBs are used to process the received frames. Processed frames from the Rx processors 222A and 222B are sent to the host using one or more DMA channels 226A/226B via host interface 118.

In one aspect, the load balancer 214 maintains a local copy of the context queues 1 and 2 (shown as 212A/212B) to track the contexts that are sent via paths 216 and 218, respectively. The load balancer 214 may use one or more registers to track the various contexts that are sent to Rx processors 222A and 222B. For example, assume that the context queues 220A/220B have a depth of 4 using two DMA channels. The depth of 4 means that each context queue 222A/222B can store 4 different contexts. In this example, the load balancer 214 will use 6 registers for each path to track the contexts using the local copies 212A/212B. The adaptive aspects of the present disclosure are not limited to the number of registers or storage locations used by the load balancer 214 to track the contexts that are sent via paths 216 and 218.

In one aspect, the load balancer 214 selects the same path for the same context. When a context for a frame is not being processed by either Rx processor, then the load balancer 214 selects the path that has the fewest pending contexts in the context queues 220A/220B. If the number of contexts in each queue is the same, then the path is selected arbitrarily.

Figure 3:
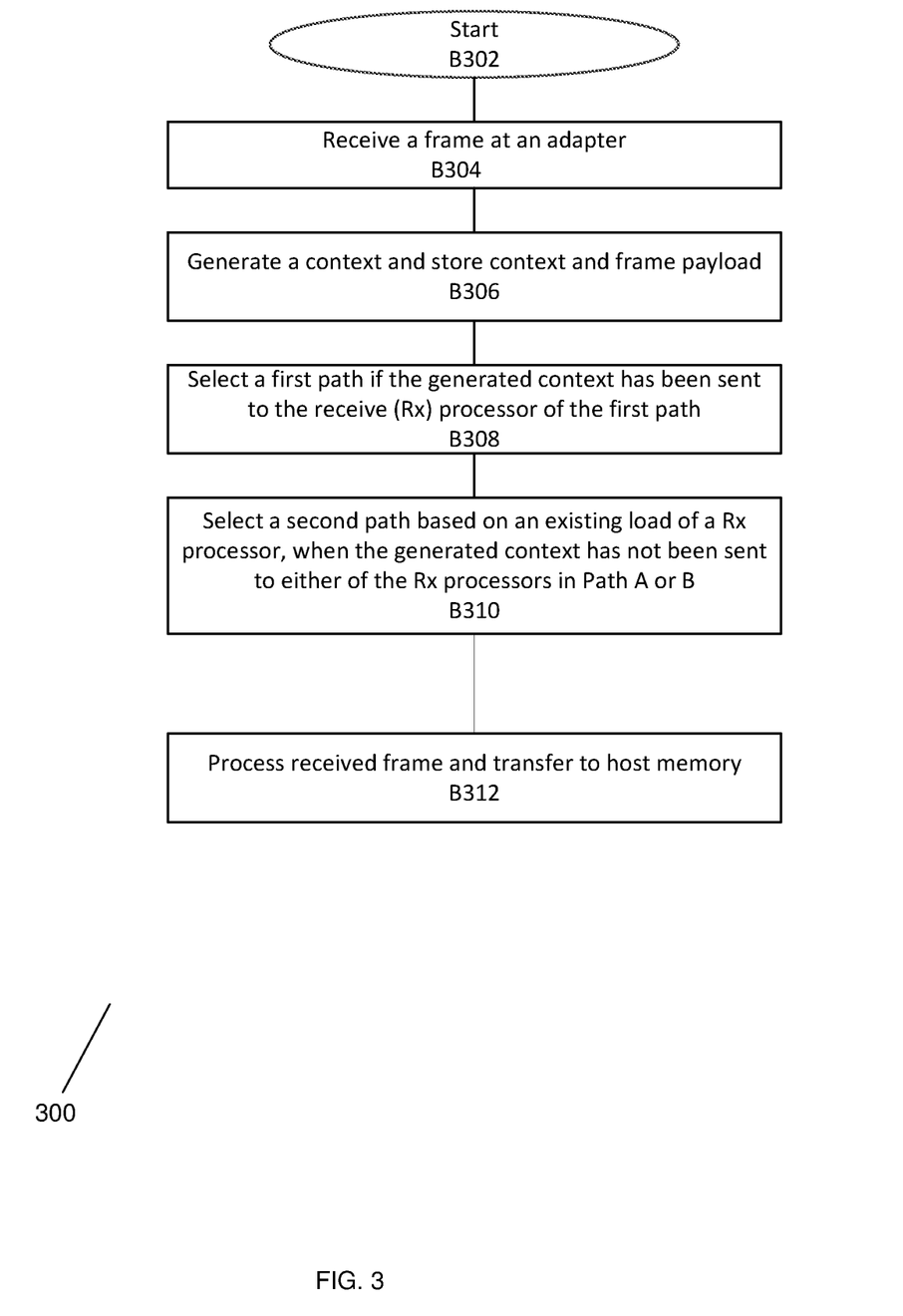
FIG. 3 shows a process flow for using the system of FIG. 2, according to one aspect of the present disclosure.

FIG. 3 shows a process for using the Rx module 131, according to one aspect of the present disclosure. The process begins in block B302, when adapter 116 is initialized and is operational to send and receive information. In block B304, a frame, for example, frame 200 (FIG. 2) is received at the adapter 116. The frame is first placed at the frame buffer 202. The context processor 204 generates a context 205 for the frame in block B306. The context 205 is stored at the context FIFO 208 and the frame payload 207 is stored at the data FIFO 210.

In block B308, the load balancer 214 selects between path 216 and 218 to send the context to a specific processor. The load balancer 214 first determines which processor may be processing another frame with the same context 205. This is determined by the load balancer using the local copy of the context queues 212A/212B. Based on the selected path, the context is placed at one of the context queues 220A or 220B.

When either processor 222A or 222B is not processing another frame with the same context (i.e. the generated context has not been sent via either paths), then in block B310, path 216 or 218 is selected based on a current workload of Rx processors 222A and 222B. The current workload for each processor is determined by the number of pending contexts in the context queues 220A and 220B, respectively.

Once a processor is selected based on blocks B308 and B310, the received frame is processed in block B312 in accordance with the IOCBs 224A/224B and then transferred to the host memory 106 via a DMA operation using one of the DMA channels 226A or 226B.

In one aspect, the foregoing process is able to move frames at a faster rate to accommodate high throughput rate because the processing resources of adapter 116 are optimized.

In one aspect, methods and systems for network devices are provided. One method includes receiving a frame by a network device (e.g. adapter 116) communicating with a computing device (e.g. 102) via a peripheral link (e.g. 115), the network device receiving the frame (e.g. 200) via a network connection; using one or more frame header fields to generate a frame context by the network device (e.g. by a load balancer 214 of adapter 116); determining if a processor (e.g. 222A or 222B) of the network device is processing another frame with the same frame context; assigning the frame context to a first processor (e.g. 222A) of the network device, when the first processor is processing the other frame with the same frame context; and when neither processor is processing the same frame context, selecting between the first processor and a second processor (e.g. 222B) of the network device, based on a workload of the first processor and the second processor, the workload determined by a number of contexts that are pending for the first processor and the second processor.

The above description presents the best mode contemplated for carrying out the present aspects, and of the manner and process of making and using them, in such full, clear, concise, and exact terms as to enable any person skilled in the art to which they pertain to make and use these aspects. These aspects are, however, susceptible to modifications and alternate constructions from that discussed above that are fully equivalent. For example, the aspects disclosed herein are applicable to any peripheral device and are not limited to any particular adapter type. Consequently, these aspects are not limited to the particular aspects disclosed. On the contrary, these aspects cover all modifications and alternate constructions coming within the spirit and scope of the aspects as generally expressed by the following claims, which particularly point out and distinctly claim the subject matter of the aspects.

What is claimed is:

1. A method, comprising:
   receiving a frame by a receive segment of the network device coupled to a computing device via a peripheral link, the network device receiving the frame for the computing device from another device via a network connection for a uniquely identified exchange;
   using one or more frame header fields to generate a frame context by the receive segment, the frame context indicating a frame source and identifying the exchange;
   determining if a first processor or a second processor of the receive segment is processing another frame with the same frame context;
   assigning the frame context to the first processor, when it is determined that the first processor is processing the other frame with the same frame context;
   when neither the first processor or the second processor is processing another frame with the same frame context, assigning the frame context to the first processor and or the second processor, based on an existing workload of the first processor and the second processor, the existing workload determined by a number of contexts that are pending for each of the first processor and the second processor; and
   processing the frame for transfer to the computing device by the first processor or the second processor, based on assignment of the frame context.

2. The method of claim 1, wherein the frame is a Fibre Channel frame.

3. The method of claim 2, wherein the frame context is generated based on a plurality of fields of a Fibre Channel frame header of the Fibre Channel Frame.

4. The method of claim 3, wherein the frame context is based on a sequence identifier field in the Fibre Channel frame header.

5. The method of claim 1, wherein a data structure tracks frame contexts for frames that are routed to the first processor and the second processor.

6. The method of claim 1, wherein the number of contexts that are pending at any given time for the first processor and the second processor is determined by checking a context first-in first-out memory for both the first processor and the second processor.

7. The method of claim 1, wherein when the workload of both the first processor and the second processor is similar, and neither the first or the second processor is processing another frame with the same frame context, then one of the first or the second processor is selected for said assignment of the frame context.

8. A non-transitory machine readable storage medium having stored thereon instructions for performing a method, comprising machine executable code which when executed by at least one machine, causes the machine to:
   receive a frame by a receive segment of the network device coupled to a computing device via a peripheral link, the network device receiving the frame for the computing device from another device via a network connection for a uniquely identified exchange;
   use one or more frame header fields to generate a frame context by the receive segment, the frame context indicating a frame source and identifying the exchange;
   determine if a first processor or a second processor of the receive segment is processing another frame with the same frame context;
   assign the frame context to the first processor, when it is determined that the first processor is processing the other frame with the same frame context;
   when neither the first processor or the second processor is processing another frame with the same frame context, assign the frame context to the first processor or the second processor, based on an existing workload of the first processor and the second processor, the existing workload determined by a number of contexts that are pending for each of the first processor and the second processor; and
   process the frame for transfer to the computing device by the first processor or the second processor, based on assignment of the frame context.

9. The non-transitory machine readable storage medium of claim 8, wherein the frame is a Fibre Channel frame.

10. The non-transitory machine readable storage medium of claim 9, wherein the frame context is generated based on a plurality of fields of a Fibre Channel frame header of the Fibre Channel Frame.

11. The non-transitory machine readable storage medium of claim 10, wherein the frame context is based on a sequence identifier field in the Fibre Channel frame header.

12. The non-transitory machine readable storage medium of claim 8, wherein a data structure tracks frame contexts for frames that are routed to the first processor and the second processor.

13. The non-transitory machine readable storage medium of claim 8, wherein the number of contexts that are pending at any given time for the first processor and the second processor is determined by checking a context first-in first-out memory for both the first processor and the second processor.

14. The non-transitory machine readable storage medium of claim 8, wherein when the workload of both the first processor and the second processor is similar, and neither the first or the second processor is processing another frame with the same frame context, then one of the first or the second processor is selected for said assignment of the frame context.

15. A system comprising:
   a processor for a computing device executing instructions out of a memory and interfacing with a network device via a peripheral link, wherein a receive segment of the network device is configured to:
   receive a frame for the processor via a network connection for a uniquely identified exchange;

use one or more frame header fields to generate a frame context indicating a frame source and identifying the exchange;

determine if a first processor or a second processor of the receive segment is processing another frame with the same frame context;

assign the frame context to the first processor, when it is determined that the first processor is processing the other frame with the same frame context;

when neither the first processor or the second processor is processing another frame with the same frame context, assign the frame context to the first processor or the second processor, based on an existing workload of the first processor and the second processor, the existing workload determined by a number of contexts that are pending for each of the first processor and the second processor; and process the frame for transfer to the computing device by the first processor or the second processor, based on assignment of the frame context.

16. The system of claim 15, wherein the frame is a Fibre Channel frame.

17. The system of claim 16, wherein the frame context is generated based on a plurality of fields of a Fibre Channel frame header of the Fibre Channel Frame.

18. The system of claim 15, wherein a data structure tracks frame contexts for frames that are routed to the first processor and the second processor.

19. The system of claim 15, wherein the number of contexts that are pending at any given time for the first processor and the second processor is determined by checking a context first-in first-out memory for both the first processor and the second processor.

20. The system of claim 15, wherein when the workload of both the first processor and the second processor is similar, and neither the first or the second processor is processing another frame with the same frame context, then one of the first or the second processor is selected for said assignment of the frame context.

* * * * *

UNITED STATES PATENT AND TRADEMARK OFFICE
CERTIFICATE OF CORRECTION

PATENT NO. : 10,740,155 B1
APPLICATION NO. : 16/146539
DATED : August 11, 2020
INVENTOR(S) : David Kwak Page 1 of 1

It is certified that error appears in the above-identified patent and that said Letters Patent is hereby corrected as shown below:

In the Specification

In Column 2, Line 6, delete "nontransitory" and insert -- non-transitory --, therefor.

In the Claims

In Column 7, Line 40, in Claim 1, after "processor" delete "and".

Signed and Sealed this
Tenth Day of November, 2020

Andrei Iancu
*Director of the United States Patent and Trademark Office*